(12) United States Patent
Schober et al.

(10) Patent No.: US 12,047,927 B2
(45) Date of Patent: Jul. 23, 2024

(54) BANDWIDTH PART INACTIVITY TIMER FOR UNLICENSED SPECTRUM OPERATIONS

(71) Applicant: Nokia Technologies Oy, Espoo (FI)

(72) Inventors: Karol Schober, Helsinki (FI); Esa Tiirola, Oulu (FI); Timo Lunttila, Espoo (FI); Kari Hooli, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 453 days.

(21) Appl. No.: 17/438,029

(22) PCT Filed: Mar. 24, 2020

(86) PCT No.: PCT/IB2020/052768
§ 371 (c)(1),
(2) Date: Sep. 10, 2021

(87) PCT Pub. No.: WO2020/194192
PCT Pub. Date: Oct. 1, 2020

(65) Prior Publication Data
US 2022/0150895 A1    May 12, 2022

Related U.S. Application Data

(60) Provisional application No. 62/825,525, filed on Mar. 28, 2019.

(51) Int. Cl.
*H04W 72/04*    (2023.01)
*H04W 72/0453*    (2023.01)
*H04W 16/14*    (2009.01)

(52) U.S. Cl.
CPC ........ *H04W 72/0453* (2013.01); *H04W 16/14* (2013.01)

(58) Field of Classification Search
CPC . H04W 72/0453; H04W 16/14; H04W 72/23; H04W 74/0808; H04W 76/38; H04L 5/0048; H04L 5/0098
See application file for complete search history.

(56) References Cited

U.S. PATENT DOCUMENTS

2020/0107323 A1* 4/2020 Zhang .................... H04W 16/14
2020/0314898 A1* 10/2020 Sun ........................ H04L 5/0048
(Continued)

FOREIGN PATENT DOCUMENTS

WO    2019/051177 A1    3/2019

OTHER PUBLICATIONS

"Revised SID on NR-based Access to Unlicensed Spectrum", 3GPP TSG RAN Meeting #80, RP-181339, Agenda: 9.4.3, Qualcomm Incorporated, Jun. 11-14, 2018, 5 pages.
(Continued)

*Primary Examiner* — John D Blanton
(74) *Attorney, Agent, or Firm* — Robert P. Michal, Esq.; Carter, DeLuca & Farrell LLP

(57) ABSTRACT

According to a first embodiment, a method may include initiating, by a user equipment, a first countdown timer associated with a first initial value and a first timer-interval, and a second countdown timer associated with a second initial value and a second timer-interval. The method may further include determining, by the user equipment, whether at least one first indication is detected during the first timer-interval. The method may further include adjusting, by the user equipment, at least one of the first countdown timer or the second countdown timer based on the determining.

19 Claims, 7 Drawing Sheets

(56) References Cited

U.S. PATENT DOCUMENTS

| | | | |
|---|---|---|---|
| 2021/0227623 A1* | 7/2021 | Park | H04W 52/02 |
| 2021/0410186 A1* | 12/2021 | Hajir | H04W 72/0453 |
| 2022/0078822 A1* | 3/2022 | Myung | H04W 72/0453 |

OTHER PUBLICATIONS

"3rd Generation Partnership Project; Technical Specification Group Radio Access Network; Study on NR-based access to unlicensed spectrum (Release 16)", 3GPP TR 38.889, V16.0.0, Dec. 2018, pp. 1-119.

"New WID on NR-based Access to Unlicensed Spectrum", 3GPP TSG RAN Meeting #82, RP-182878, Agenda: 9.1.1, Qualcomm Incorporated, Dec. 10-13, 2018, 8 pages.

"3rd Generation Partnership Project; Technical Specification Group Radio Access Network; NR; Medium Access Control (MAC) protocol specification (Release 15)", 3GPP TS 38.321, V15.4.0, Dec. 2018, pp. 1-77.

"NRU wideband BWP operation", 3GPP TSG RAN WG1 Meeting #96, R1-1901529, Agenda: 7.2.2.2.5, Huawei, Feb. 25-Mar. 1, 2019, 8 pages.

"Wide-band operation for NR-U", 3GPP TSG RAN WG1 #96, R1-1902044, Agenda: 7.2.2.2.5, LG Electronics, Feb. 25-Mar. 1, 2019, 6 pages.

International Search Report and Written Opinion received for corresponding Patent Cooperation Treaty Application No. PCT/IB2020/052768, dated Jun. 22, 2020, 17 pages.

"3rd Generation Partnership Project; Technical Specification Group Radio Access Network; NR; Radio Resource Control (RRC) protocol specification (Release 15)", 3GPP TS 38.331, V15.5.0, Mar. 2019, pp. 1-491.

"3rd Generation Partnership Project; Technical Specification Group Radio Access Network; NR; Physical layer procedures for control (Release 15)", 3GPP TS 38.213, V15.5.0, Mar. 2019, pp. 1-104.

* cited by examiner

BANDWIDTH PART INACTIVITY TIMER FOR UNLICENSED SPECTRUM OPERATIONS

RELATED APPLICATION

This application claims priority to PCT Application No. PCT/IB2020/052768, filed on Mar. 24, 2020, which claims priority to U.S. Application No. 62/825,525, filed on Mar. 28, 2019, each of which is incorporated herein by reference in its entirety.

BACKGROUND

Field

Various communication systems may benefit from improved bandwidth part switching inactivity timers in scenarios where communication system nodes are contending for a channel.

Description of the Related Art

In 3rd Generation Partnership Project (3GPP) new radio (NR) release (Rel)-15, bandwidth part (BWP) inactivity timers may be used to switch from a wide BWP to a default BWP, such as a narrow BWP, if a base station does not have data to transmit to a user equipment (UE) over a certain period in time. In particular, the base station may set a BWP switching inactivity timer to an initial value. In response, the UE may decrement the value of the inactivity timer by one for each subframe, such as 1 ms, in NR frequency range 1 (FR1), and each half-subframe in NR frequency range 2 (FR2). However, if the UE receives unicast downlink control information (DCI) in such a subframe or half-subframe, the UE may reset the timer to its initial value. When the timer reaches zero, the UE may automatically switch to a predefined default BWP, such as a narrow BWP to conserve power.

BRIEF DESCRIPTION OF THE DRAWINGS

For proper understanding of this disclosure, reference should be made to the accompanying drawings, wherein.

DETAILED DESCRIPTION

Figure 1:
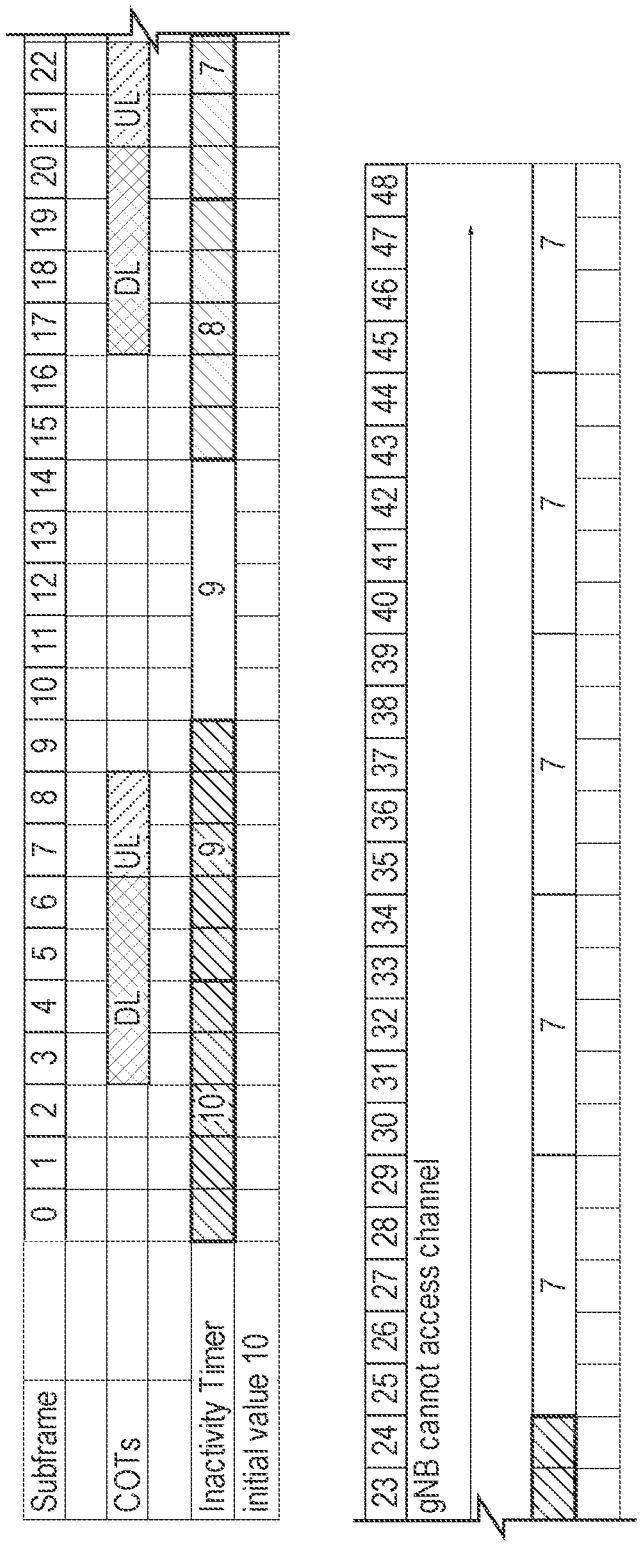
FIG. 1 illustrates an example of subframes without a COT timer and with a large timer-interval according to certain embodiments.

Under 3GPP technical specification (TS) 38.213, if a UE is associated with a bandwidth part inactivity timer value for a primary cell, such as bwp-InactivityTimer, and the timer is running, the UE may decrement the timer at the end of a subframe for FR1, or at the end of a half subframe for FR2, if the restarting conditions defined in TS 38.321 are not met during the interval of the subframe for FR1, or of the half subframe for FR2.

For a cell where a UE modifies an active downlink (DL) BWP due to a BWP inactivity timer expiration, for accommodating a delay in the active DL BWP change, and/or an active uplink (UL) BWP change required by the UE, the UE may not be required to receive or transmit in the cell during a time duration from the start of a subframe for FR1 (or of half of a subframe for FR2) that is immediately after the BWP inactivity timer expires until the start of a slot where the UE may receive and/or transmit.

According to 3GPP TS 38.321, V15.4.0, Section 5.15, a medium access control (MAC) entity may be activated for each activated serving cell configured with bwp-InactivityTimer, and operate according to the following logic:

if the defaultDownlinkBWP-Id is configured, and the active DL BWP is not the BWP indicated by the defaultDownlinkBWP-Id; or if the defaultDownlinkBWP-Id is not configured, and the active DL BWP is not the initialDownlinkBWP:

if a PDCCH addressed to C-RNTI or CS-RNTI indicating downlink assignment or uplink grant is received on the active BWP; or if a PDCCH addressed to C-RNTI or CS-RNTI indicating downlink assignment or uplink grant is received for the active BWP; or if a MAC PDU is transmitted in a configured uplink grant or received in a configured downlink assignment:

if there is no ongoing Random Access procedure associated with this Serving Cell; or if the ongoing Random Access procedure associated with this Serving Cell is successfully completed upon reception of this PDCCH addressed to C-RNTI (as specified in 3GPP TS 38.321 sub-clauses 5.1.4 and 5.1.5):

start or restart the bwp-InactivityTimer associated with the active DL BWP.

if the bwp-InactivityTimer associated with the active DL BWP expires:

if the defaultDownlinkBWP-Id is configured:

perform BWP switching to a BWP indicated by the defaultDownlinkBWP-Id.

else:

perform BWP switching to the initialDownlinkBWP.

if a PDCCH for BWP switching is received, and the MAC entity switches the active DL BWP:

if the defaultDownlinkBWP-Id is configured, and the MAC entity switches to the DL BWP which is not indicated by the defaultDownlinkBWP-Id; or if the defaultDownlinkBWP-Id is not configured, and the MAC entity switches to the DL BWP which is not the initialDownlinkBWP:

start or restart the bwp-InactivityTimer associated with the active DL BWP.

It is noted that if a random access procedure (RAP) is initiated on a secondary cell, both the secondary cell and the special cell are associated with this RAP.

In unlicensed spectrum operation, there may be periods of time when a base station may not access a channel, such due to listen before talk (LBT) failure, and cannot send unicast DCI scrambled with cell radio network temporary identifier (C-RNTI) or any other signals due to the channel being occupied by other nodes, such as 5G NR unlicensed spectrum (NR-U), LTE LAA, or WiFi. Specifically, on unlicensed spectrum, inactivity of the base station is not a reliable indication that the base station has no data to transmit to the UE, but may indicate a failure by the base station to access the channel and being unable to transmitted data. Thus, a UE configured with a BWP inactivity timer may switch to a narrow default BWP, also known as a pre-defined BWP, when the UE should instead be configured to listen for wide BWP, listening on all sub-bands within wide BWP. With this faulty indication, the UE may experience undesirable BWP switching, degrading latency and throughput performance.

Huawei 3GPP contribution (R1-1901529) describes that, in order to avoid switching the active BWP due to premature expiration of the associated inactivity timer, the UE may pause the timer when the medium access is blocked when detected by the UE. Similarly, LG Electronics 3GPP contribution R1-1902044 suggests keeping a timer outside the transmission of the serving base station. However, both of these proposals are unclear as to "medium access blocked" and "inside gNB transmission," resulting in differing interpretations by the base station and UE of when the timer stops and actually expires.

Certain embodiments described herein may have various benefits and/or advantages to overcome the disadvantages described above by optimizing BWP switching inactivity timers compared to NR Rel-15 solutions. For example, existing signalling may be used to carry slot/COT structure on group-common PDCCH as a way to assess whether and how to adjust bwp-InactivityTimer. As a result, certain embodiments may result in improved reliability and latency, and reduced power consumption. Thus, certain embodiments are directed to improvements in computer-related technology.

Certain embodiments described herein may adjust the BWP inactivity timer according to reception of group common physical downlink control channel (GC-PDCCH), or an initial signal, such as physical downlink control channel (PDCCH) demodulation reference signal (DMRS) within particular time periods. Initial signal may, at least, be transmitted at the beginning of at least one DL burst in order to facilitate detection of the DL burst of a serving cell at the UE. CG-PDCCH may indicate at least the time domain structure of the gNB acquired COT (channel occupancy time).

In some embodiments, a UE may be configured with at least a first countdown timer associated with a first countdown timer initial value and a first countdown timer interval of a first time scale, and a second countdown timer associated with a second countdown timer initial value and a second countdown timer interval of a second time scale. The first countdown timer may be a channel occupancy time (COT) countdown timer, and the second countdown timer may be an inactivity countdown timer. The first time scale and the second time scale may be the same or may be different. The second timer interval may be larger than at least one subframe for FR1 and half-subframe for FR2, and the second countdown timer may, at particular times, be reset to the second initial value by unicast DCI. The first countdown timer may be reset upon reception by the UE of one or more of at least one initial signal within the first countdown timer interval, such as wide band DMRS related to PDCCH, at least one GC-PDCCH, and at least one discovery reference signal (DRS), which may also contain at least one physical broadcast channel (PBCH). Unless at least one of these triggers (or a predefined subset of these triggers) are received within the first countdown timer interval, the first countdown timer may be decremented by one in units of the first timer interval.

In certain embodiments, the UE may decrement the second countdown timer by the second interval if the first countdown timer is not configured and the UE receives at least one of the triggers noted above during the period defined by the second timer interval. Alternatively, the UE may decrement the second countdown timer if the first countdown timer is configured and has a counter value not equal to zero.

In various embodiments, if an additional trigger is received in GC-PDCCH, the first countdown timer may be deactivated for all associated UEs when the base station has no data to transmit and would not access at least one channel. In response, the UE may decrement the second countdown timer according to Rel-15, and/or switch to at least one default BWP to conserve power when the second countdown timer expires.

In some embodiments, at least one GC-PDCCH indication may provide at least one synchronization signal for the first countdown timer. As an example, the at least one GC-PDCCH indication may contain at least one indication of at least one value of the first countdown timer for the base station. In some examples, the indication may be the outcome of at least one modulo operation of at least one value of the first countdown timer. The at least one modulo operation may be used to reduce the number of bits needed for the indication. Furthermore, the UE may determine the slots of the first countdown timer based on at least one first timer structure indication in at least one received GC-PDCCH, and/or reset the first countdown timer to the first initial value for each first countdown timer interval which overlaps with slots of the COT determined from the COT structure indication in at least one received GC-PDCCH.

FIG. 1 illustrates an example of subframes without a first countdown timer (COT timer) and with a large timer-interval according to certain embodiments. Here, the base station may not be scheduling DL or UL unicast data for a UE, leaving the base station inactive for the UE, but serving other UEs instead. The UE may be configured only with the second timer (an inactivity countdown timer) associated with the second timer initial value and the second timer interval of the second time scale, for example, 5 ms. The base station may transmit at least one initial signal, for example GC-PDCCH, in every subframe. If at least one GC-PDCCH/initial signal is received within the configured interval of the second countdown timer, where 5 subframes correlate with 5 ms, the UE may decrement the timer. Thus, a large second interval provides robustness with respect to UE missing parts of COT due to, for example, large interference from transmitting node other than serving gNB.

Figure 2:
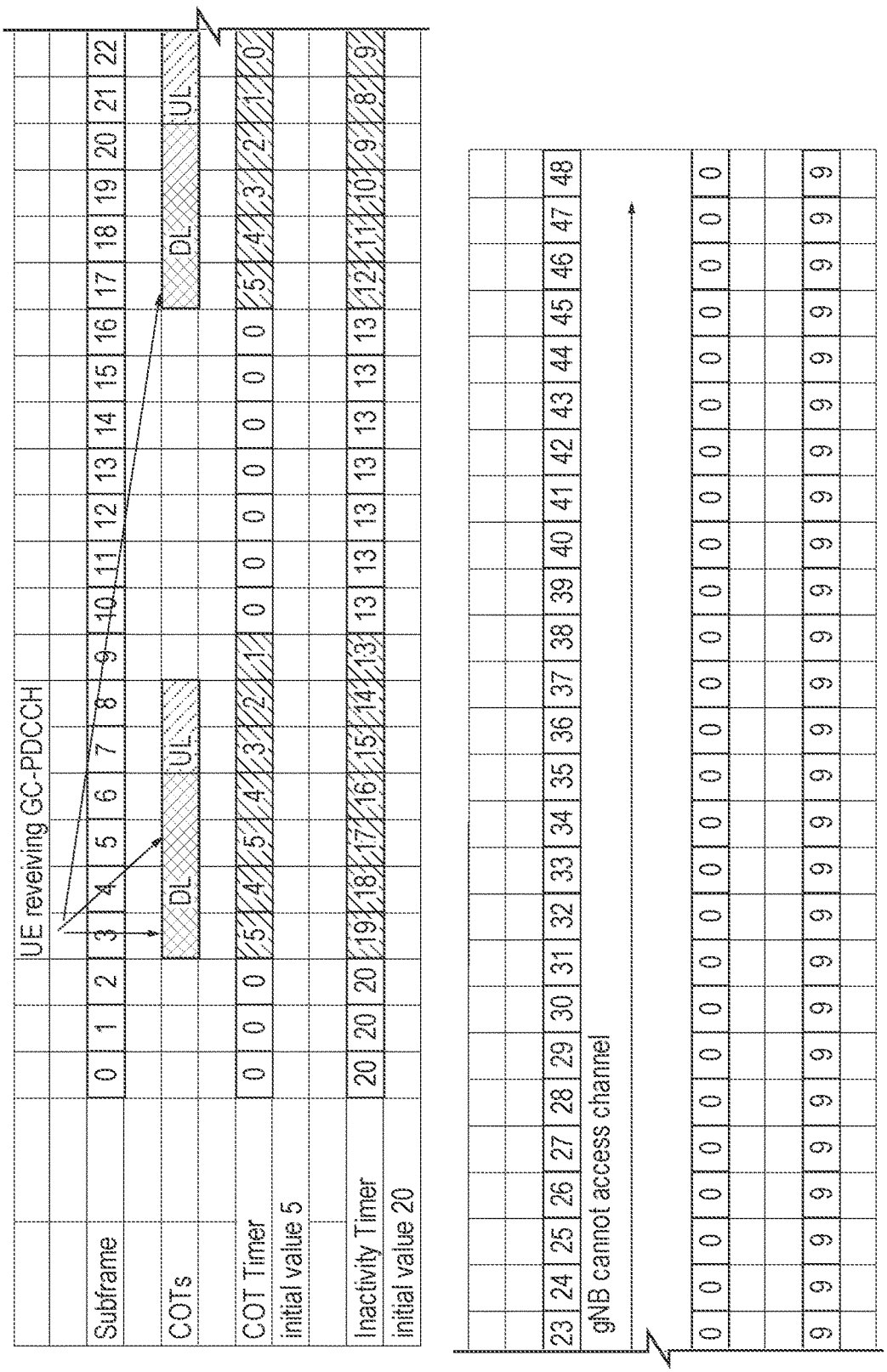
FIG. 2 illustrates an example of an additional COT timer according to certain embodiments.

FIG. 2 illustrates interaction between a configured first timer interval with a first time scale of one subframe, and a configured second timer interval with a second time scale of one subframe. When the first countdown timer, such as the COT timer illustrated in FIG. 2, is not zero, the second countdown timer, such as the inactivity timer illustrated in FIG. 2, may be decremented. The arrows illustrate the time instances where GC-PDCCH is transmitted. The first countdown timer may create a buffer. If one GC-PDCCH is not received by the UE, such as in subframe 3, the next GC-PDCCH transmitted by the base station and received by the UE may ensure that the first countdown timer returns to synchronization. In this example, BWP switching does not happen since the second timer does not reach zero.

Figure 3:
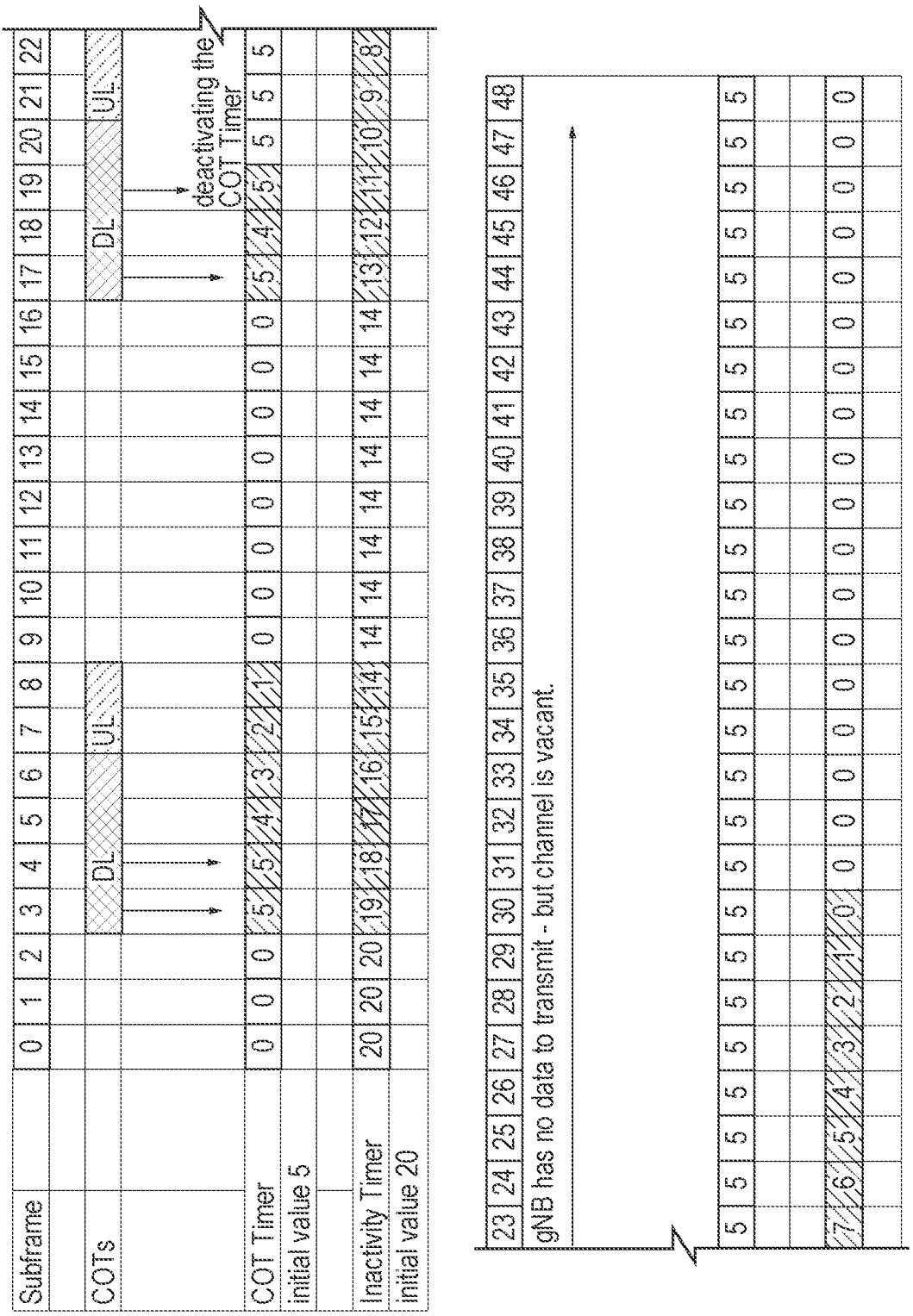
FIG. 3 illustrates an example of an additional COT timer and GC-PDCCH-deactivating COT timer according to certain embodiments.

FIG. 3 illustrates an additional first countdown timer (COT timer in FIG. 3) deactivated by GC-PDCCH. Similar to FIG. 2, this example shows that during the second COT, the base station may transmit one additional indication such as one bit in GC-PDCCH, which deactivates the first countdown timer countdown, for example, by deactivating the first countdown timer. Based on that the second countdown timer (inactivity timer in FIG. 3) may be decremented until it reaches zero. The base station may determine to deactivate the first countdown time since no more data is in the buffer. Without this deactivation, the UE may stay in wide BWP when the base station is idle due to no data in buffer and no longer transmitting or transmitting a limited number of signals, such as GC-PDCCH or initial signal. The base station may activate and/or reactivate the first countdown timer, for example, by transmitting the initial signal and/or the unicast DCI to the UE, and/or by changing/reversing the value of the additional indication in the GC-PDCCH. In this way, the UE may activate and/or reactivate the first countdown timer, for example, upon detecting the initial signal and/or the unicast DCI and/or GC-PDCCH with a changed/reversed value on the additional indication. Following the activation/reactivation, the UE may decrement the second countdown timer if the first countdown timer value is non-zero.

Figure 4:
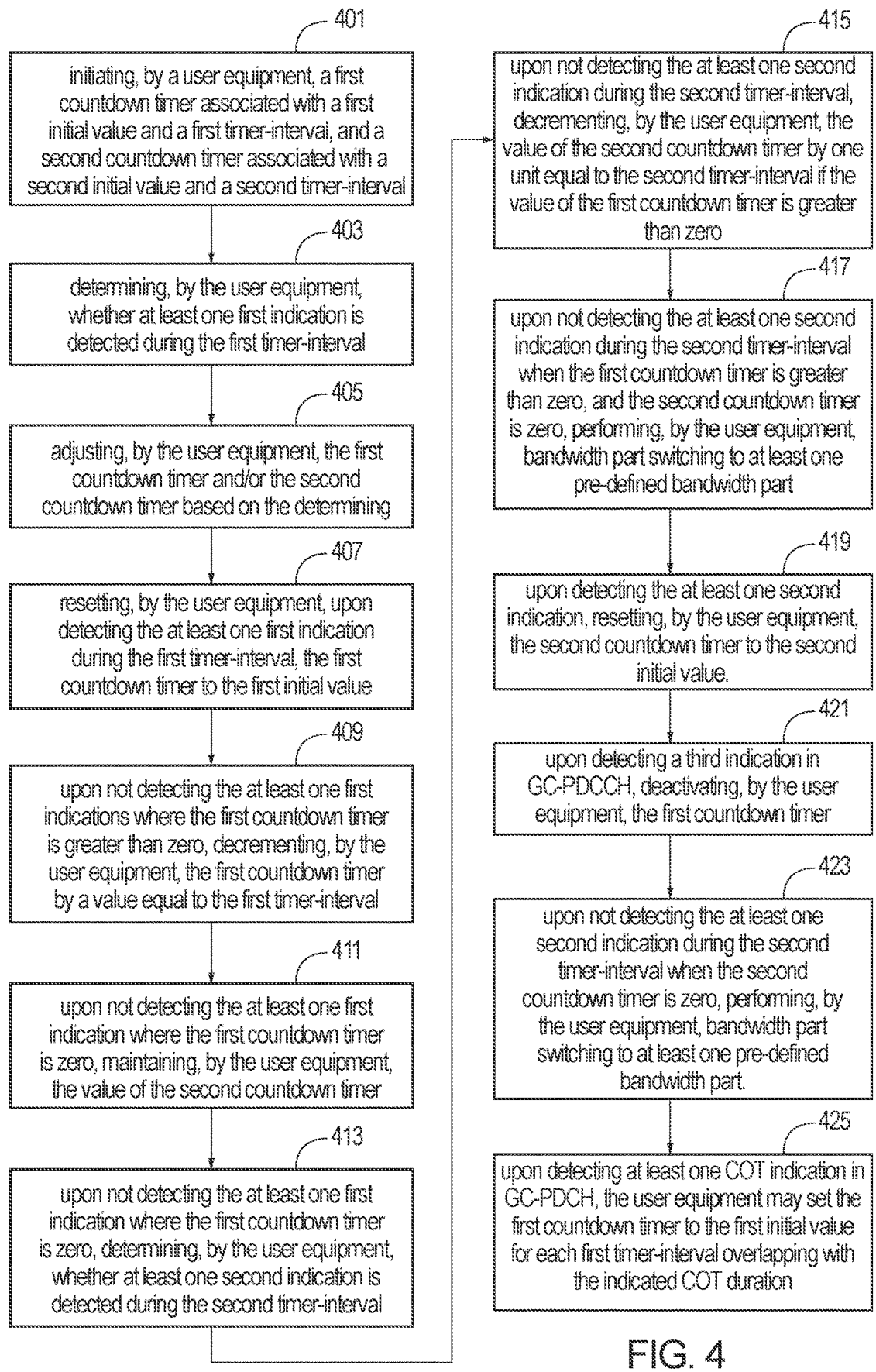
FIG. 4 illustrates an example of a method performed by a user equipment according to certain embodiments.
Figure 7:
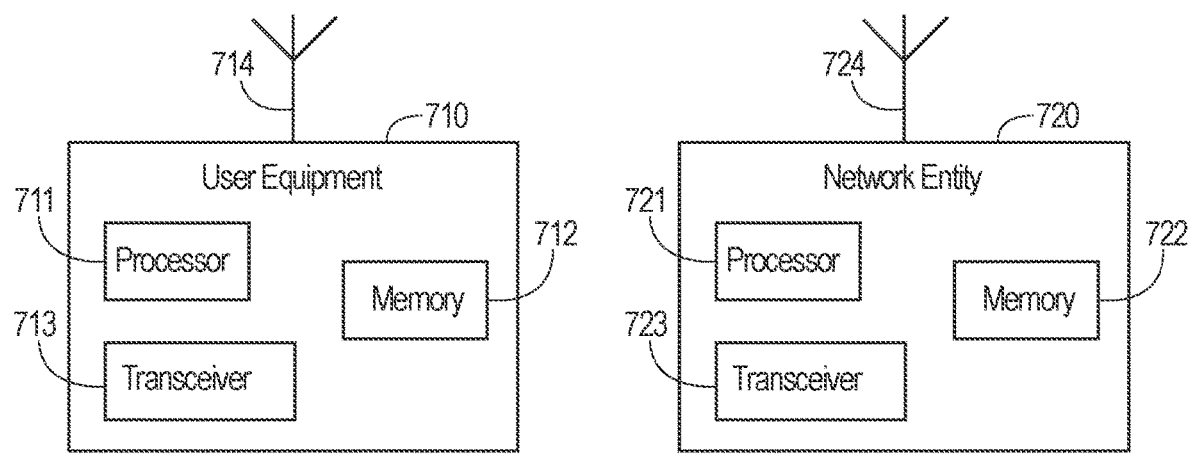
FIG. 7 illustrates another example of a system according to certain embodiments.

FIG. 4 illustrates an example of a method performed by a user equipment, such as user equipment 710 illustrated in FIG. 7, according to certain embodiments. In step 401, the user equipment may initiate a first countdown timer associated with a first initial value and a first timer-interval of a first time scale, and a second countdown timer associated with a second initial value and a second timer-interval of a second time scale. The first countdown timer may be a channel occupancy time (COT) countdown timer, and the second countdown timer may be an inactivity countdown timer. The inactivity countdown timer may be a 3GPP Rel-15 inactivity timer. The first time scale and the second time scale may be the same or may be different. The first countdown timer may be reset upon reception by the UE of one or more of at least one initial signal. The at least one initial signal may comprise, for example, at least one of wide band DMRS related to PDCCH, GC-PDCCH, and/or discovery reference signal (DRS), also comprise at least one physical broadcast channel (PBCH). The second timer-interval may be equal or larger than at least one subframe in FR1 and half-frame in FR2, and the second countdown timer may, at times, be reset to the second initial value by unicast DCI. PDCCH may be transmitted using at least one physical resource given by at least one control resource set (CORESET) configuration. The set of PDCCH candidates for a UE to monitor on a CORESET may be defined in terms of PDCCH search space sets. UE may detect wideband DMRS related to PDCCH based on the CORESET configuration, for example, in all monitoring occasions of all search space sets associated with the CORESET. In some embodiments, wideband DMRS related to PDCCH may be detected based on monitoring occasions of at least one GC-PDCCH search space set associated to the CORESET. Wideband DMRS related to PDCCH may cover all the DMRS resource elements of the CORESET.

In step 403, the user equipment may determine whether at least one first indication is detected during the first timer-interval. The at least one first indication may comprise one or more of at least one predefined signal and/or at least one predefined channel. The at least one first indication may be one or more of at least one initial signal, wherein the at least one initial signal comprises at least one of wide band DMRS related to PDCCH, GC-PDCCH, or discovery reference signal (DRS) physical broadcast channel (PBCH). In some embodiments, at least one GC-PDCCH indication may provide at least one synchronization signal for the first countdown timer. As an example, the at least one GC-PDCCH indication may contain at least one indication of at least one value of the first countdown timer for the base station, for example by at least one modulo operation. In some examples, the at least one GC-PDCCH indication may be the outcome of at least one modulo operation of at least one value of the first countdown timer. The at least one modulo operation may be used to reduce the number of bits needed for the indication. Furthermore, upon detecting at least one COT indication in GC-PDCCH, the user equipment may set the first countdown timer to the first initial value for each first timer-interval overlapping with the indicated COT duration.

In step 405, the user equipment may adjust the first countdown timer and/or the second countdown timer based on the determining. In step 407, the user equipment may, upon detecting the at least one first indication during the first timer-interval, reset the first countdown timer to the first initial value. In step 409, the user equipment may, upon not detecting the at least one first indication where the first countdown timer is greater than zero, decrement the first countdown timer by one unit equal to the first timer-interval. In step 411, the user equipment may, upon not detecting the at least one first indication where the first countdown timer is zero, maintain the second countdown timer at zero. In step 413, the user equipment may, upon not detecting the at least one first indication where the first countdown timer is zero, determine whether at least one second indication is detected during the second timer-interval. The at least one second indication may comprise at least one of downlink or uplink unicast data scheduling.

In step 415, the user equipment may, upon not detecting the at least one second indication during the second timer-interval, decrement the value of the second countdown timer by one unit equal to the second timer-interval if the value of the first countdown timer is greater than zero. In step 417, upon not detecting the at least one second indication during the second timer-interval when the first countdown timer is greater than zero and the second countdown timer is zero, the user equipment may perform bandwidth part switching to at least one pre-defined bandwidth part. The at least one pre-defined bandwidth part may be a default bandwidth part, or may be a default value of bandwidth part. In step 419, the user equipment may, upon detecting the at least one second indication, reset the second countdown timer to the second initial value. In step 421, upon detecting a third indication in GC-PDCCH, the user equipment may deactivate the first countdown timer. In some embodiments, the third indication may be associated with at least one additional trigger received in GC-PDCCH that is configured to deactivate the first countdown timer for all associated UEs when the base station has no data to transmit and would not access at least one channel. In step 423, upon not detecting the at least one second indication during the second timer-interval when the second countdown timer is zero, the user equipment may perform bandwidth part switching to at least one pre-defined bandwidth part. In step 425, upon detecting at least one COT indication in GC-PDCH, the user equipment may set the second countdown timer to the second initial value for each second timer-interval overlapping with the indicated COT duration.

Figure 5:
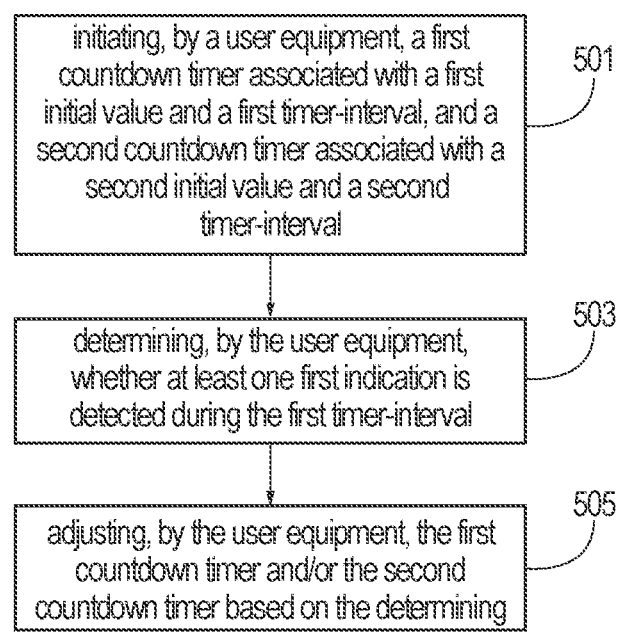
FIG. 5 illustrates an example of another method performed by a user equipment according to certain embodiments.

FIG. 5 illustrates an example of a method performed by a user equipment, such as user equipment 710 illustrated in FIG. 7, according to certain embodiments. In step 501, the user equipment may initiate a first countdown timer associated with a first initial value and a first timer-interval of a first time scale, and a second countdown timer associated with a second initial value and a second timer-interval of a second time scale. The first countdown timer may be a channel occupancy time (COT) countdown timer, and the second countdown timer may be an inactivity countdown timer. The inactivity countdown timer may be a 3GPP Rel-15 inactivity timer. The first time scale and the second time scale may be the same or may be different. The first countdown timer may be reset upon reception by the UE of one or more of at least one initial signal. The at least one initial signal may comprise, for example, at least one of wide band DMRS related to PDCCH, GC-PDCCH, and/or discovery reference signal (DRS), also comprise at least one physical broadcast channel (PBCH). The second timer-interval may be equal or larger than at least one subframe in FR1 and half-frame in FR2, and the second countdown timer may, at times, be reset to the second initial value by unicast DCI. PDCCH may be transmitted using at least one physical resource given by at least one control resource set (CORESET) configuration. The set of PDCCH candidates for a UE to monitor on a CORESET may be defined in terms of PDCCH search space sets. UE may detect wideband DMRS related to PDCCH based on the CORESET configuration, for example, in all monitoring occasions of all search space sets associated with the CORESET. In some embodiments, wideband DMRS related to PDCCH may be detected based on monitoring occasions of at least one GC-PDCCH search space set associated to the CORESET. Wideband DMRS related to PDCCH may cover all the DMRS resource elements of the CORESET.

In step 503, the user equipment may determine whether at least one first indication is detected during the first timer-interval. The at least one first indication may comprise one or more of at least one predefined signal and/or at least one predefined channel. The at least one first indication may be one or more of at least one initial signal, wherein the at least one initial signal comprises at least one of wide band DMRS related to PDCCH, GC-PDCCH, or discovery reference signal (DRS) physical broadcast channel (PBCH). In some embodiments, at least one GC-PDCCH indication may provide at least one synchronization signal for the first countdown timer. As an example, the at least one GC-PDCCH indication may contain at least one indication of at least one value of the first countdown timer for the base station, for example by at least one modulo operation. In some examples, the at least one GC-PDCCH indication may be the outcome of at least one modulo operation of at least one value of the first countdown timer. The at least one modulo operation may be used to reduce the number of bits needed for the indication. Furthermore, upon detecting at least one COT indication in GC-PDCH, the user equipment may set the first countdown timer to the first initial value for each first timer-interval overlapping with the indicated COT duration. In step 505, the user equipment may adjust the first countdown timer and/or the second countdown timer based on the determining Certain embodiments described in FIG. 5 may include various features and limitations described in FIG. 4 above.

Figure 6:
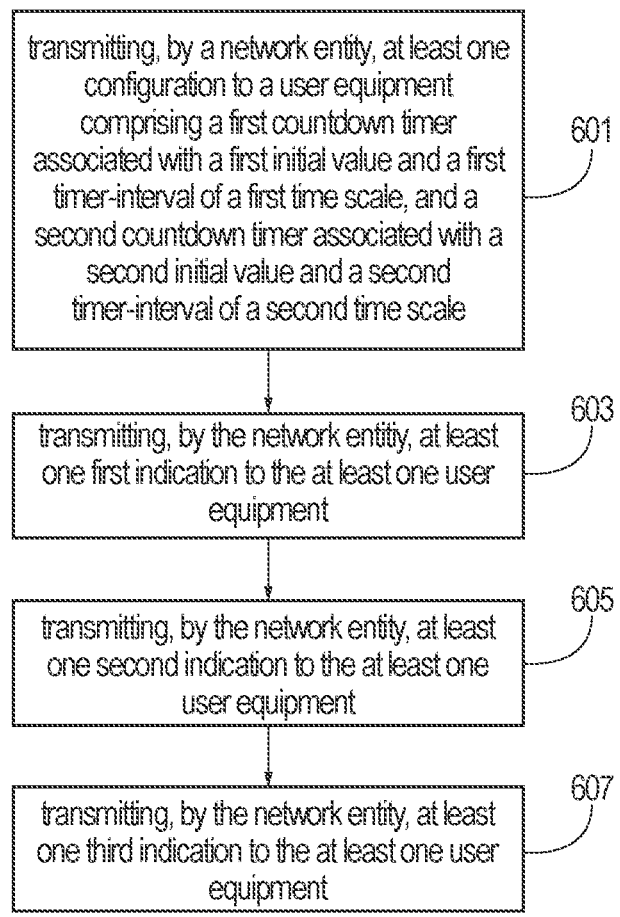
FIG. 6 illustrates an example of a method performed by a network entity according to certain embodiments.

FIG. 6 illustrates an example of a method performed by a network entity, such as network entity 720 illustrated in FIG. 7, according to certain embodiments. In step 601, the network entity may transmit at least one configuration to a user equipment, such as user equipment 710 in FIG. 7, comprising a first countdown timer associated with a first initial value and a first timer-interval of a first time scale, and a second countdown timer associated with a second initial value and a second timer-interval of a second time scale.

In step 603, the network entity may transmit at least one first indication to the at least one user equipment. The at least one first indication may comprise one or more of at least one predefined signal and/or at least one predefined channel. The at least one first indication may be one or more of at least one initial signal, wherein the at least one initial signal comprises at least one of wide band DMRS related to PDCCH, GC-PDCCH, or discovery reference signal (DRS) physical broadcast channel (PBCH). The at least one first indication may be configured to reset the first countdown timer to the first initial value and/or decrement the second countdown timer by one for each second timer-interval until the second countdown timer is equal to zero.

In step 605, the network entity may transmit at least one second indication to the at least one user equipment. The at least one second indication may comprise at least one of downlink or uplink unicast data scheduling. The at least one second indication may be configured to reset the second countdown timer to the second initial value.

In step 607, the network entity may transmit at least one third indication to the at least one user equipment. The at least one third indication may be configured to deactivate the first countdown timer and/or decrement the second countdown timer by a value equal to the second timer-interval. The at least one third indication may be associated with at least one additional trigger received in GC-PDCCH that is configured to deactivate the first countdown timer for all associated UEs when the base station has no data to transmit and would not access at least one channel. The at least one third indication may be configured to decrement the second countdown timer by one for each second timer-interval until the second countdown timer is equal to zero. The at least one third indication of second value may be configured to activate and/or reactivate the first countdown timer in response to a determination to activate and/or reactivate the first countdown timer.

FIG. 7 illustrates an example of a system according to certain example embodiments. In one example embodiment, a system may include multiple devices, such as, for example, UE 710 and/or NE 720.

UE 710 may include one or more of a mobile device, such as a mobile phone, smart phone, personal digital assistant (PDA), tablet, or portable media player, digital camera, pocket video camera, video game console, navigation unit, such as a global positioning system (GPS) device, desktop or laptop computer, single-location device, such as a sensor or smart meter, or any combination thereof.

NE 720 may be one or more of a base station, such as an evolved node B (eNB) or 5G or New Radio node B (gNB), a serving gateway, a server, and/or any other access node or combination thereof. Furthermore, UE 710 and/or NE 720 may be one or more of a citizens broadband radio service device (CBSD).

One or more of these devices may include at least one processor, respectively indicated as 711 and 721. Processors 711 and 721 may be embodied by any computational or data processing device, such as a central processing unit (CPU), application specific integrated circuit (ASIC), or comparable device. The processors may be implemented as a single controller, or a plurality of controllers or processors.

At least one memory may be provided in one or more of devices indicated at 712 and 722. The memory may be fixed or removable. The memory may include computer program instructions or computer code contained therein. Memories 712 and 722 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate from the one or more processors. Furthermore, the computer program instructions stored in the memory and which may be processed by the processors may be any suitable form of computer program code, for example, a compiled or interpreted computer program written in any suitable programming language. Memory may be removable or non-removable.

Processors 711 and 721 and memories 712 and 722 or a subset thereof, may be configured to provide means corresponding to the various blocks of FIGS. 1-6. Although not shown, the devices may also include positioning hardware, such as GPS or micro electrical mechanical system (MEMS) hardware, which may be used to determine a location of the device. Other sensors are also permitted and may be included to determine location, elevation, orientation, and so forth, such as barometers, compasses, and the like.

As shown in FIG. 7, transceivers 713 and 723 may be provided, and one or more devices may also include at least one antenna, respectively illustrated as 714 and 724. The device may have many antennas, such as an array of antennas configured for multiple input multiple output (MIMO) communications, or multiple antennas for multiple radio access technologies. Other configurations of these devices, for example, may be provided. Transceivers 713 and 723 may be a transmitter, a receiver, or both a transmitter and a receiver, or a unit or device that may be configured both for transmission and reception.

The memory and the computer program instructions may be configured, with the processor for the particular device, to cause a hardware apparatus such as user equipment to perform any of the processes described below (see, for example, FIGS. 1-6). Therefore, in certain example embodiments, a non-transitory computer-readable medium may be encoded with computer instructions that, when executed in hardware, perform a process such as one of the processes described herein. Alternatively, certain example embodiments may be performed entirely in hardware.

In certain example embodiments, an apparatus may include circuitry configured to perform any of the processes or functions illustrated in FIGS. 1-6. For example, circuitry may be hardware-only circuit implementations, such as analog and/or digital circuitry. In another example, circuitry may be a combination of hardware circuits and software, such as a combination of analog and/or digital hardware circuit(s) with software or firmware, and/or any portions of hardware processor(s) with software (including digital signal processor(s)), software, and at least one memory that work together to cause an apparatus to perform various processes or functions. In yet another example, circuitry may be hardware circuit(s) and or processor(s), such as a microprocessor(s) or a portion of a microprocessor(s), that include software, such as firmware for operation. Software in circuitry may not be present when it is not needed for the operation of the hardware.

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

One having ordinary skill in the art will readily understand that certain embodiments discussed above may be practiced with steps in a different order, and/or with hardware elements in configurations which are different than those which are disclosed. Therefore, it would be apparent to those of skill in the art that certain modifications, variations, and alternative constructions would be apparent, while remaining within the spirit and scope of the invention. In order to determine the metes and bounds of the invention, therefore, reference should be made to the appended claims.

| Partial Glossary | |
|---|---|
| 3GPP | 3rd Generation Partnership Project |
| BW | Bandwidth |
| BWP | Bandwidth Part |
| COT | Channel Occupancy Time |
| CP | Cyclic Prefix |
| CORESET | Control Resource Set |
| DCI | Downlink Control Information |
| DMRS | Demodulation Reference Signal |
| DRS | Discovery Reference Signal |
| eMBB | Enhanced Mobile Broadband |
| eNB | Evolved Node B |
| EPC | Evolved Packet Core |
| FR1 | Frequency Range 1 (410 MHz to 7.125 GHz) |
| FR2 | Frequency Range 2 (24.25 GHz to 52.60 GHz) |
| GC | Group Common |
| GC-PDCCH | Group-Common Physical Downlink Control Channel |
| gNB | Next Generation eNB |
| GP | Guard Period |
| GPS | Global Positioning System |
| LAA | Licensed Assisted Access |
| LBT | Listen Before Talk |
| LTE | Long-Term Evolution |
| MCOT | Maximum Channel Occupancy Time |
| MCS | Modulation and Coding Scheme |
| MME | Mobility Management Entity |
| MTC | Machine-Type Communications |
| NR | New Radio |
| NR-U | New Radio Unlicensed |
| OFDM | Orthogonal Frequency Division Multiplexing |
| PBCH | Physical Broadcast Channel |
| PDCCH | Physical Downlink Control Channel |
| PDCP | Packet Data Convergence Protocol |
| PDSCH | Physical Downlink Shared Channel |
| PUCCH | Physical Uplink Control Channel |
| PUSCH | Physical Uplink Shared Channel |
| RAN | Radio Access Network |
| RAP | Random Access Procedure |
| RLC | Radio Link Control |
| RS | Reference Signal |
| TA | Timing Advance |
| Tx | Transmit |
| UE | User Equipment |
| UL | Uplink |
| URLLC | Ultra-Reliable and Low-Latency Communication |
| WLAN | Wireless Local Area Network |

According to a first embodiment, a method may include initiating, by a user equipment, a first countdown timer associated with a first initial value and a first timer-interval, and a second countdown timer associated with a second initial value and a second timer-interval. The method may further include determining, by the user equipment, whether at least one first indication is detected during the first timer-interval. The method may further include adjusting, by the user equipment, at least one of the first countdown timer or the second countdown timer based on the determining.

In a variant, the first countdown timer may comprise a channel occupancy time (COT) countdown timer, and the second countdown timer may comprise an inactivity countdown timer.

In a further variant, the inactivity countdown timer may be a 3GPP Rel-15 inactivity timer.

In a variant, the method may further include receiving, by the user equipment, at least one configuration associated with the at least one of the first countdown timer or the second countdown timer.

In a variant, the first countdown timer may comprise a timer value of zero or greater.

In a variant, the first countdown timer may be deactivated.

In a variant, the second countdown timer may comprise a timer value of zero or greater.

In a variant, the second countdown timer may be deactivated.

In a variant, the at least one first indication may comprise one or more of at least one predefined signal and/or at least one predefined channel.

In a further variant, the at least one first indication may comprise one or more of at least one initial signal, wherein the at least one initial signal comprises at least one of wide band DMRS related to PDCCH, GC-PDCCH, or discovery reference signal (DRS) physical broadcast channel (PBCH).

In a variant, upon detecting the at least one first indication during the first timer-interval, the user equipment may reset the first countdown timer to the first initial value.

In a variant, upon not detecting the at least one first indication where the first countdown timer is greater than zero, decrementing, by the user equipment, the first countdown timer by a value equal to the first timer-interval.

In a variant, upon not detecting the at least one first indication where the first countdown timer is zero, maintaining, by the user equipment, the value of the second countdown timer.

In a variant, upon not detecting the at least one first indication where the first countdown timer is zero, the user equipment may determine whether at least one second indication is detected during the second timer-interval.

In a further variant, the at least one second indication may comprise at least one of downlink or uplink unicast data scheduling.

In a further variant, upon not detecting the at least one second indication during the second timer-interval, the user equipment may decrement the value of the second countdown timer by one unit equal to the second timer-interval if the value of the first countdown timer is greater than zero.

In a variant, upon not detecting the at least one second indication during the second timer-interval when the second countdown timer is zero, the user equipment may perform bandwidth part switching to at least one pre-defined bandwidth part.

In a variant, upon detecting the at least one second indication, the user equipment may reset the second countdown timer to the second initial value.

In a variant, upon detecting a third indication in GC-PDCCH, the user equipment may deactivate the first countdown timer.

In a variant, upon detecting a third indication of a first value in GC-PDCCH, the user equipment may perform decrementing the second countdown timer by one for each second timer-interval until at least one of the following occurs: 1) the second countdown timer is equal to zero, 2) the first indication is detected, 3) the second indication is detected, or 4) the third indication of a second value is detected.

In a variant, upon detecting at least one COT indication in GC-PDCH, the user equipment may set the first countdown timer to the first initial value for each first timer-interval overlapping with the indicated COT duration.

According to a second embodiment, a method may include transmitting, by a network entity, at least one configuration to a user equipment comprising a first countdown timer associated with a first initial value and a first timer-interval of a first time scale, and a second countdown timer associated with a second initial value and a second timer-interval of a second time scale. The method may further include transmitting, by the network entity, at least one first indication to the at least one user equipment. The method may further include transmitting, by the network entity, at least one second indication to the at least one user equipment. The method may further include transmitting, by the network entity, at least one third indication to the at least one user equipment.

In a variant, the at least one first indication may comprise one or more of at least one predefined signal and/or at least one predefined channel.

In a further variant, the at least one first indication may be one or more of at least one initial signal, wherein the at least one initial signal comprises at least one of wide band DMRS related to PDCCH, GC-PDCCH, or discovery reference signal (DRS) physical broadcast channel (PBCH).

In a variant, the at least one first indication may be configured to reset the first countdown timer to the first initial value and/or decrement the second countdown timer by one for each second timer-interval until the second countdown timer is equal to zero.

In a variant, the at least one second indication may comprise at least one of downlink or uplink unicast data scheduling.

In a variant, the at least one second indication may be configured to reset the second countdown timer to the second initial value.

In a variant, the at least one third indication may be configured to deactivate the first countdown timer and/or decrement the second countdown timer by a value equal to the second timer-interval.

In a variant, the at least one third indication may be associated with at least one additional trigger received in GC-PDCCH that is configured to deactivate the first countdown timer for all associated UEs when the base station has no data to transmit and would not access at least one channel.

In a variant, the at least one third indication may be configured to decrement the second countdown timer by one for each second timer-interval until the second countdown timer is equal to zero.

In a variant, the at least one third indication of second value may be configured to activate and/or reactivate the first countdown timer in response to a determination to activate and/or reactivate the first countdown timer.

According to a third embodiment and a fourth embodiment, an apparatus can include at least one processor and at least one memory and computer program code. The at least one memory and the computer program code can be configured to, with the at least one processor, cause the apparatus at least to perform a method according to the first embodiment, the second embodiment, and any of their variants.

According to a fifth embodiment and a sixth embodiment, an apparatus can include means for performing the method according to the first embodiment, the second embodiment, and any of their variants.

According to a seventh embodiment and an eighth embodiment, a computer program product may encode instructions for performing a process including a method according to the first embodiment, the second embodiment, and any of their variants.

According to a ninth embodiment and a tenth embodiment, a non-transitory computer-readable medium may encode instructions that, when executed in hardware, perform a process including a method according to the first embodiment, the second embodiment, and any of their variants.

According to an eleventh embodiment and a twelfth embodiment, a computer program code may include instructions for performing a method according to the first embodiment, the second embodiment, and any of their variants.

According to a thirteenth embodiment and a fourteenth embodiment, an apparatus may include circuitry configured to perform a process including a method according to the first embodiment, the second embodiment, and any of their variants.

We claim:

1. An apparatus comprising:
at least one processor; and
at least one memory and computer program code;
the at least one memory and the computer program code is configured to, with the at least one processor, cause the apparatus at least to:
initiate a first countdown timer associated with a first initial value and a first timer-interval, and a second countdown timer associated with a second initial value and a second timer-interval;
determine whether at least one first indication is detected during the first timer-interval, wherein the at least one first indication is a group common physical downlink control channel (GC-PDCCH) indication that is the outcome of at least one modulo operation of at least one value of the first countdown timer, wherein the modulo operation is used to reduce the number of bits for the at least one first indication; and
adjust at least one of the first countdown timer or the second countdown timer based on the determining.

2. The apparatus of claim 1, wherein the first countdown timer comprises a channel occupancy time countdown timer, and the second countdown timer comprises an inactivity countdown timer.

3. The apparatus of claim 1, wherein the at least one memory and the computer program code is configured to, with the at least one processor, cause the apparatus at least to: receive at least one configuration associated with the at least one of the first countdown timer or the second countdown timer.

4. The apparatus of claim 1, wherein the first countdown timer comprises a timer value of zero or greater.

5. The apparatus of claim 1, wherein the first countdown timer is deactivated.

6. The apparatus of claim 1, wherein the second countdown timer comprises a timer value of zero or greater.

7. The apparatus of claim 1, wherein the second countdown timer is deactivated.

8. The apparatus of claim 1, wherein the at least one first indication comprises one or more of at least one initial signal, wherein the at least one initial signal comprises at least one of wide band demodulation reference signal related to physical downlink control channel, group common-physical downlink control channel, or discovery reference signal physical broadcast channel.

9. The apparatus of claim 1, wherein the at least one memory and the computer program code is configured to, with the at least one processor, cause the apparatus at least to: upon detecting the at least one first indication during the first timer-interval, reset the first countdown timer to the first initial value.

10. The apparatus of claim 1, wherein the at least one memory and the computer program code is configured to, with the at least one processor, cause the apparatus at least to: upon not detecting the at least one first indication where the first countdown timer is greater than zero, decrement the first countdown timer by a value equal to the first timer-interval.

11. The apparatus of claim 1, wherein the at least one memory and the computer program code is configured to, with the at least one processor, cause the apparatus at least to: upon not detecting the at least one first indication where the first countdown timer is zero, maintain the value of the second countdown timer.

12. The apparatus of claim 1, wherein the at least one memory and the computer program code is configured to, with the at least one processor, cause the apparatus at least to: upon not detecting the at least one first indication where the first countdown timer is zero, determine whether at least one second indication is detected during the second timer-interval.

13. The apparatus of claim 12, wherein the at least one memory and the computer program code is configured to, with the at least one processor, cause the apparatus at least to: upon not detecting the at least one second indication during the second timer-interval, decrement the value of the second countdown timer by one unit equal to the second timer-interval if the value of the first countdown timer is greater than zero.

14. The apparatus of claim 12, wherein the at least one memory and the computer program code is configured to, with the at least one processor, cause the apparatus at least to: upon not detecting the at least one second indication during the second timer-interval when the second countdown timer is zero, perform bandwidth part switching to at least one pre-defined bandwidth part.

15. The apparatus of claim 12, wherein the at least one memory and the computer program code is configured to, with the at least one processor, cause the apparatus at least to: upon detecting the at least one second indication, reset the second countdown timer to the second initial value.

16. The apparatus of claim 1, wherein the at least one memory and the computer program code is configured to, with the at least one processor, cause the apparatus at least to: upon detecting a third indication in group common-physical downlink control channel, deactivate the first countdown timer.

17. The apparatus of claim 1, wherein the at least one memory and the computer program code is configured to, with the at least one processor, cause the apparatus at least to: upon detecting a third indication of a first value in group common-physical downlink control channel, decrement the second countdown timer by one for each second timer-interval until at least one of the following occurs: 1) the second countdown timer is equal to zero, 2) the first indication is detected, 3) the second indication is detected, or 4) the third indication of a second value is detected.

18. The apparatus of claim 1, wherein the at least one memory and the computer program code is configured to, with the at least one processor, cause the apparatus at least to: upon detecting at least one channel occupancy time duration indication in group common-physical downlink channel, set the first countdown timer to the first initial value for each first timer-interval overlapping with the at least one channel occupancy time duration.

19. A method comprising:
   initiating, by a user equipment, a first countdown timer associated with a first initial value and a first timer-interval, and a second countdown timer associated with a second initial value and a second timer-interval;
   determining, by the user equipment, whether at least one first indication is detected during the first timer-interval, wherein the at least one first indication is a group common physical downlink control channel (GC-PDCCH) indication that is the outcome of at least one modulo operation of at least one value of the first countdown timer, wherein the modulo operation is used to reduce the number of bits for the at least one first indication; and
   adjusting, by the user equipment, at least one of the first countdown timer or the second countdown timer based on the determining.

* * * * *